(12) United States Patent
Hostetler (10) Patent No.: US 11,785,871 B2
(45) Date of Patent: Oct. 17, 2023

(54) ADJUSTABLE CULTIVATOR APPARATUS, SYSTEMS, AND METHODS

(71) Applicant: TH Fabrication, LLC, El Paso, IL (US)

(72) Inventor: Jonathan Hostetler, El Paso, IL (US)

(73) Assignee: TH Fabrication, LLC, El Paso, IL (US)

( * ) Notice: Subject to any disclaimer, the term of this patent is extended or adjusted under 35 U.S.C. 154(b) by 357 days.

(21) Appl. No.: 17/146,310

(22) Filed: Jan. 11, 2021

(65) Prior Publication Data

US 2021/0212245 A1 Jul. 15, 2021

Related U.S. Application Data

(60) Provisional application No. 62/959,017, filed on Jan. 9, 2020.

(51) Int. Cl.
*A01B 1/22* (2006.01)
*A01B 1/14* (2006.01)

(52) U.S. Cl.
CPC ............... *A01B 1/222* (2013.01); *A01B 1/14* (2013.01)

(58) Field of Classification Search
CPC .................................. A01B 1/222; A01B 1/14
See application file for complete search history.

(56) References Cited

U.S. PATENT DOCUMENTS

| | | | | |
|---|---|---|---|---|
| 1,207,579 A * | 12/1916 | Lowry | ............ | A01B 21/06 172/523 |
| 2,319,899 A * | 5/1943 | Silver | ............ | A01B 39/14 172/551 |
| 4,461,355 A * | 7/1984 | Peterson et al. | ....... | A01B 39/14 172/624.5 |
| 4,560,011 A * | 12/1985 | Peterson et al. | ....... | A01B 39/14 172/194 |
| 5,361,848 A * | 11/1994 | Fleischer et al. | ...... | A01B 63/26 172/194 |
| 2003/0178209 A1* | 9/2003 | Knobloch et al. | ... | A01B 13/025 172/145 |
| 2009/0273160 A1* | 11/2009 | Friggstad et al. | ..... | A01B 63/22 280/442 |
| 2014/0166321 A1* | 6/2014 | Hurd | ............ | A01B 35/16 172/548 |
| 2019/0373801 A1* | 12/2019 | Schoeny et al. | ..... | A01B 79/005 |

* cited by examiner

Primary Examiner — Tara Mayo
(74) Attorney, Agent, or Firm — Todd R. Fronek; Larkin Hoffman Daly & Lindgren, Ltd.

(57) ABSTRACT

An adjustment assembly configured to be coupled with a longitudinal support assembly of a cultivator assembly is disclosed. The adjustment assembly includes a swing arm rotationally coupled to the longitudinal support assembly, a first gang unit rotationally coupled with the swing arm and a second gang unit spaced apart from the first gang unit and rotationally coupled with the swing arm. A first gang adjustment mechanism rotates the first gang unit with respect to the longitudinal support assembly and a second gang adjustment mechanism rotates the second gang unit with respect to the longitudinal support assembly.

14 Claims, 12 Drawing Sheets

ADJUSTABLE CULTIVATOR APPARATUS, SYSTEMS, AND METHODS

BACKGROUND

Cultivators are used in farming operations to work soil. Some such cultivators include a plurality of gang units disposed along a length for working soil in rows.

SUMMARY

An adjustment assembly configured to be coupled with a longitudinal support assembly of a cultivator assembly is disclosed. The adjustment assembly includes a swing arm rotationally coupled to the longitudinal support assembly, a first gang unit rotationally coupled with the swing arm and a second gang unit spaced apart from the first gang unit and rotationally coupled with the swing arm. A first gang adjustment mechanism rotates the first gang unit with respect to the longitudinal support assembly and a second gang adjustment mechanism rotates the second gang unit with respect to the longitudinal support assembly.

DESCRIPTION

Referring to FIGS. 1-7, an example embodiment of a cultivator row unit assembly 100 is illustrated. In general, the cultivator row unit assembly 100 is supported on a frame such as a transversely extending toolbar (not shown) by a bracket assembly 102. The cultivator row unit assembly 100 optionally incorporates one or more ground-engaging implements 104 (herein illustrated as gang units 104-1 and 104-2, commercially known as spider gangs), which engage the soil surface during use. In the illustrated embodiment, gang units 104-1 and 104-2 each include a plurality of individual gangs. In some embodiments, one or more biasing elements (e.g., springs, actuators, etc.) may be employed to apply downward pressure to the implements 104. Implements 104 are connected to and supported by bracket assembly 102 through a longitudinal support assembly 106 and an adjustment assembly 108.

During use, cultivator row unit assembly 100 travels along a direction of travel T, with gang unit 104-1 positioned with respect to the direction of travel T to rotate about a rotational axis $R_1$ and gang unit 104-2 positioned with respect to the direction of travel T to rotate about a rotational axis $R_2$. Each gang of gang unit 104-1 rotates about rotational axis $R_1$, whereas each gang of gang unit 104-2 rotates about rotational axis $R_2$. The longitudinal support assembly 106 extends along the direction of travel T and the adjustment assembly 108 is configured to adjust the rotational axes $R_1$ and $R_2$ together with respect to the direction of travel T and adjust the rotational axes $R_1$ and $R_2$ independently with respect to one another. As illustrated, the rotational axis $R_1$ is positioned at a first angle $\alpha_1$ with respect to the direction of travel T and the rotational axis $R_2$ is positioned at a second angle $\alpha_2$ with respect to the direction of travel T. As discussed below, the adjustment assembly 108 can be used to position both rotational axes $R_1$ and $R_2$ together about the direction of travel T or adjust each of the rotational axes $R_1$ and $R_2$ independently.

Bracket assembly 102 includes a front bracket 120 formed of a front plate 120-1 and side plates 120-2, 120-3. The front plate 120-1 can be secured to a toolbar using a suitable fastener (e.g., bolts). Connected with the side plates 120-2, 120-3 are four pivot links 122 (shown as 122-1 through 122-4), each pivot link 122 coupled to one of the side plates 120-2, 120-3 and supported by a corresponding bushing 124 (shown as a top bushing 124-1 and a bottom bushing 124-2). Connection among the bracket 120, pivot links 122 and bushings 124 can be secured using suitable fastening elements (e.g., bolts, washers, bushings and the like). At an opposite end from bracket 120, pivot links 122 are connected with longitudinal support assembly 106 through corresponding bushings 126 (shown as a top bushing 126-1 and a bottom bushing 126-2). Tube spacers 128 (shown as a top tube spacer 128-1 and a bottom spacer 128-2) can further be provided to secure opposed pivot links 122 to one another and enhance structural integrity of the bracket assembly 102. For example, pivot links 122-1 and 122-3 can be secured together through tube spacer 128-1, whereas pivot links 122-2 and 122-4 can be secured together through tube spacer 128-2.

Longitudinal support assembly 106 includes a vertical tube member 130 and side gusset plates 132 (shown as plates 132-1 and 132-2) secured to bushings 126, for example through corresponding fastening elements such as bolts, washers, bushings and the like. A tube 134 is secured between plates 132 (e.g., with welded thereto) and extends in a rearward direction (along a direction of travel for cultivator row unit assembly 100) to connect with adjustment assembly 108. In particular, the tube 134 terminates at a bushing 136.

Adjustment assembly 108 includes a top plate 140, a bottom plate 142, a swing arm tube 144 and a support shaft 146. The top plate 140 and bottom plate 142 are secured to the tube 134 (e.g., through welding), whereas the swing arm tube 144 and support shaft 146 pivot about the bushing 136 (i.e., about a vertical axis A). As illustrated, the bottom plate 142 includes a plurality of apertures 148 configured to receive a pin 150 therein to select an angle of the swing arm tube 144 relative to the tube 134. Once an angle is selected, the pin 150 can be inserted through one of the plurality of apertures 148 and through a corresponding aperture in the swing arm tube 144 to secure the swing arm tube 144 in the selected angle relative to the tube 134. In order to select a different angle, the pin 150 can be removed from the swing arm tube 144 and the plate 142. Next, the swing arm tube 144 can then pivot about axis A to the new selected angle and the pin 150 can then be reinserted through plate 142 and swing arm tube 144. Pivoting swing arm tube 144 about axis A causes rotation of both rotational axes $R_1$ and $R_2$ about the direction of travel T.

Positioned at opposite ends of the swing arm tube 144 are a pair of gang support brackets 151 and 152. The gang support bracket 151 includes an L-shaped mounting plate 151-1 and opposed side plates 151-2 and 151-3. In a similar manner, gang support bracket 152 includes an L-shaped mounting plate 152-1 and opposed side plates 152-2 and 152-3. Gang adjustment mechanisms 160 and 162 connect the swing arm tube 144 with corresponding gangs 104-1 and 104-2, respectively. Gang adjustment mechanism 160 can be used to rotate rotational axis $R_1$ about the direction of travel T and with respect to rotational axis $R_2$. In a similar manner, gang adjustment mechanism 162 can be used to rotate rotational axis $R_2$ about the direction of travel T and with respect to rotational axis $R_1$.

Figure 1:
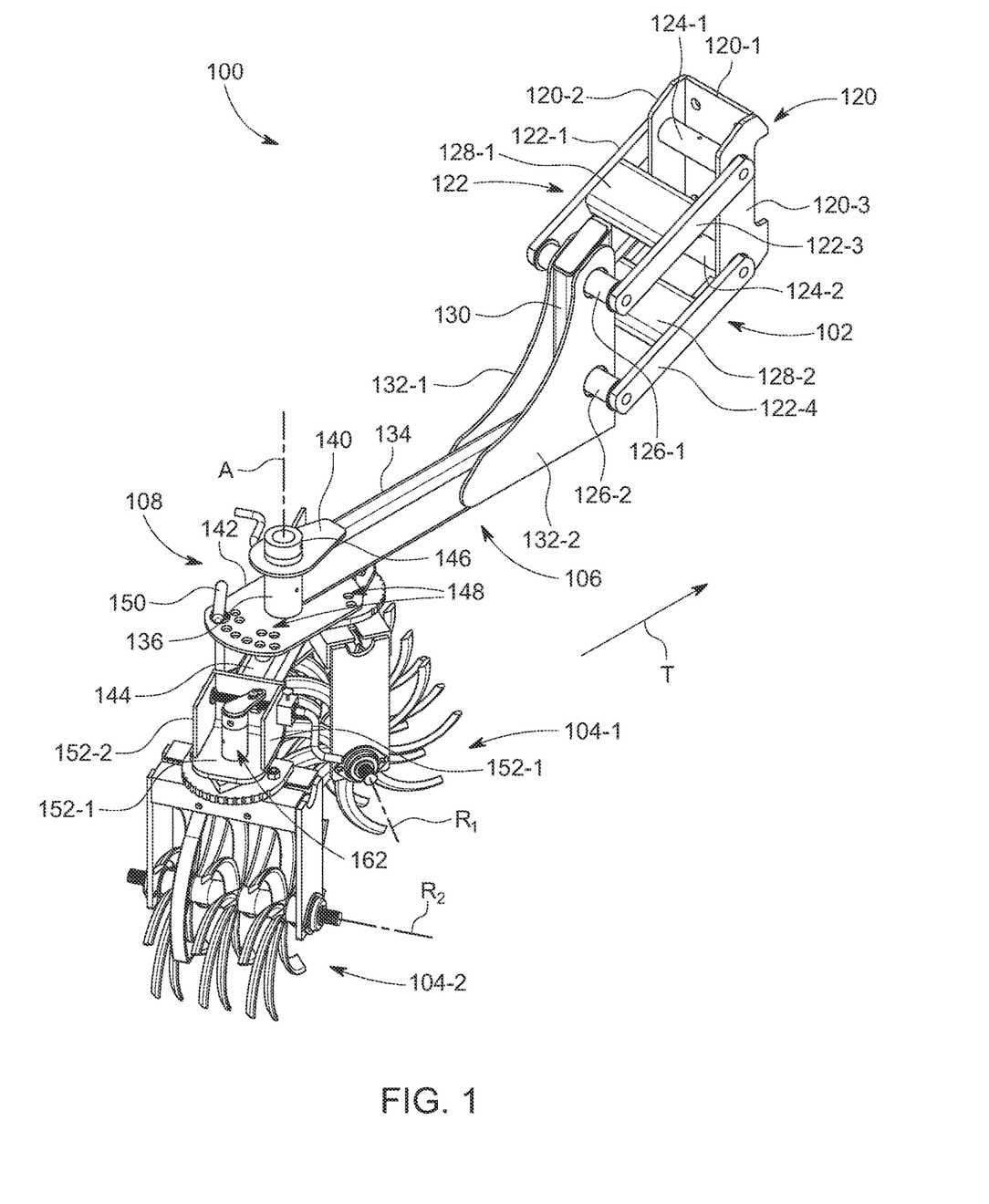
FIG. 1 is a perspective view of an adjustable cultivator row unit assembly.
Figure 2:
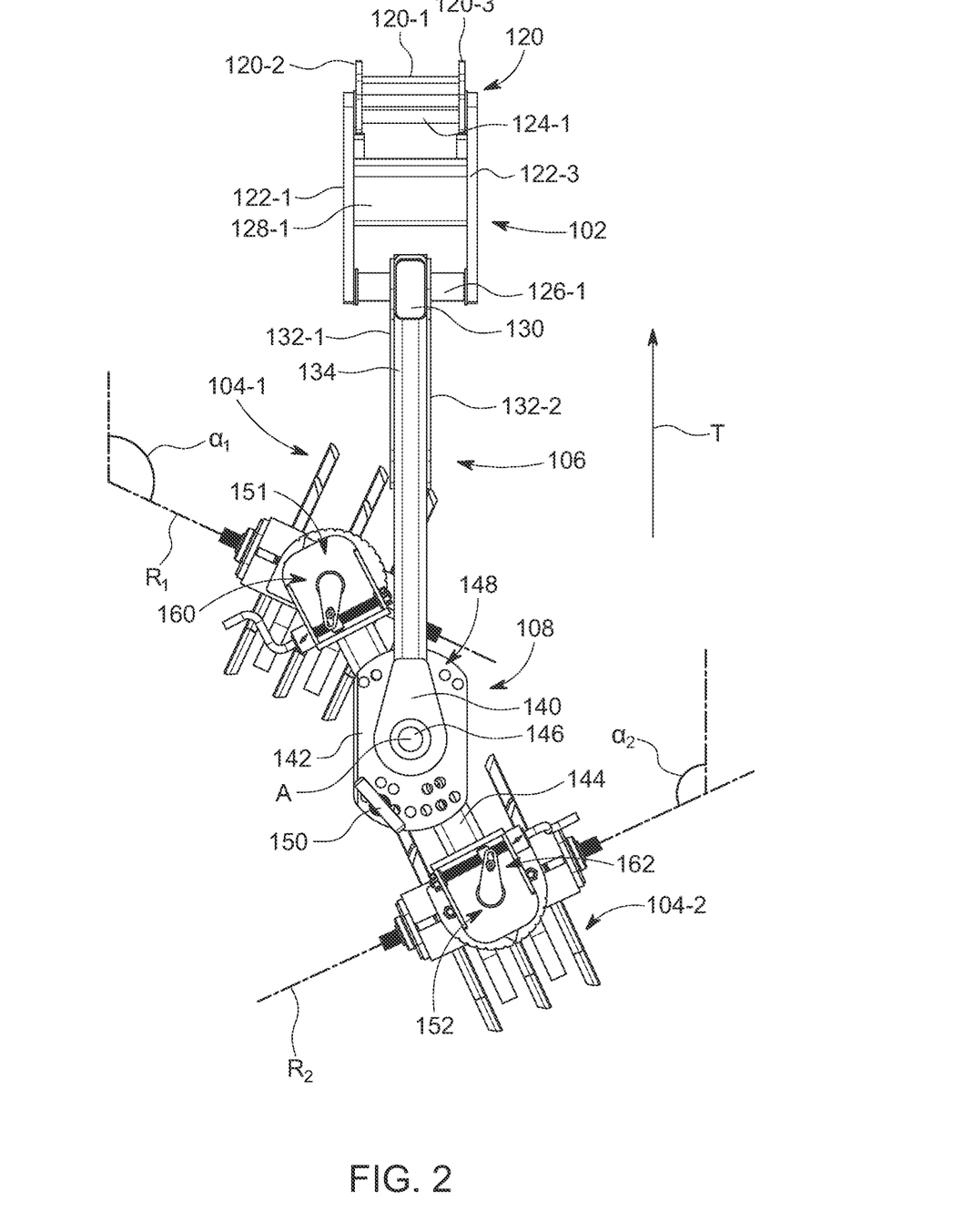
FIG. 2 is a top plan view of the cultivator row unit assembly of FIG. 1.
Figure 3:
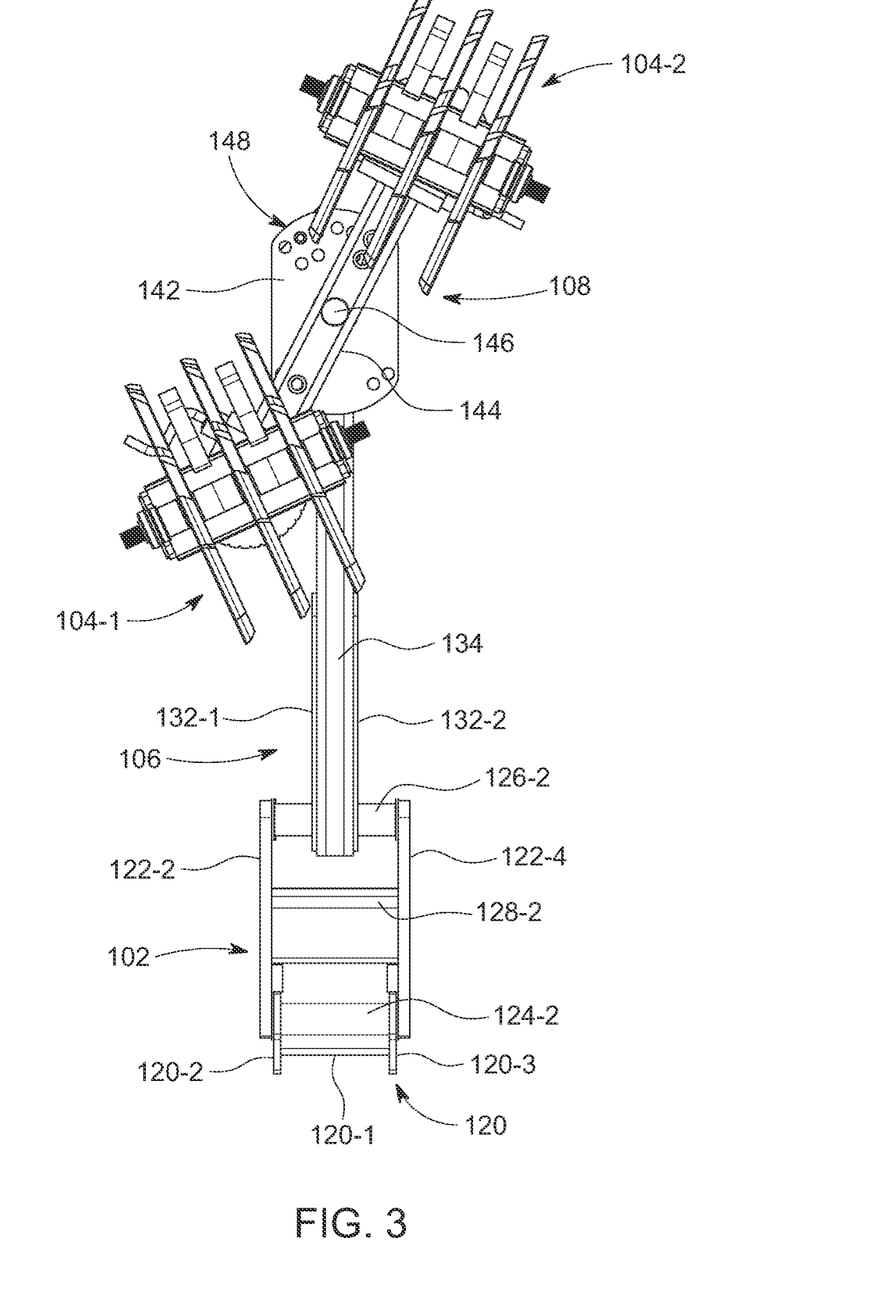
FIG. 3 is a bottom plan view of the cultivator row unit assembly of FIG. 1.
Figure 4:
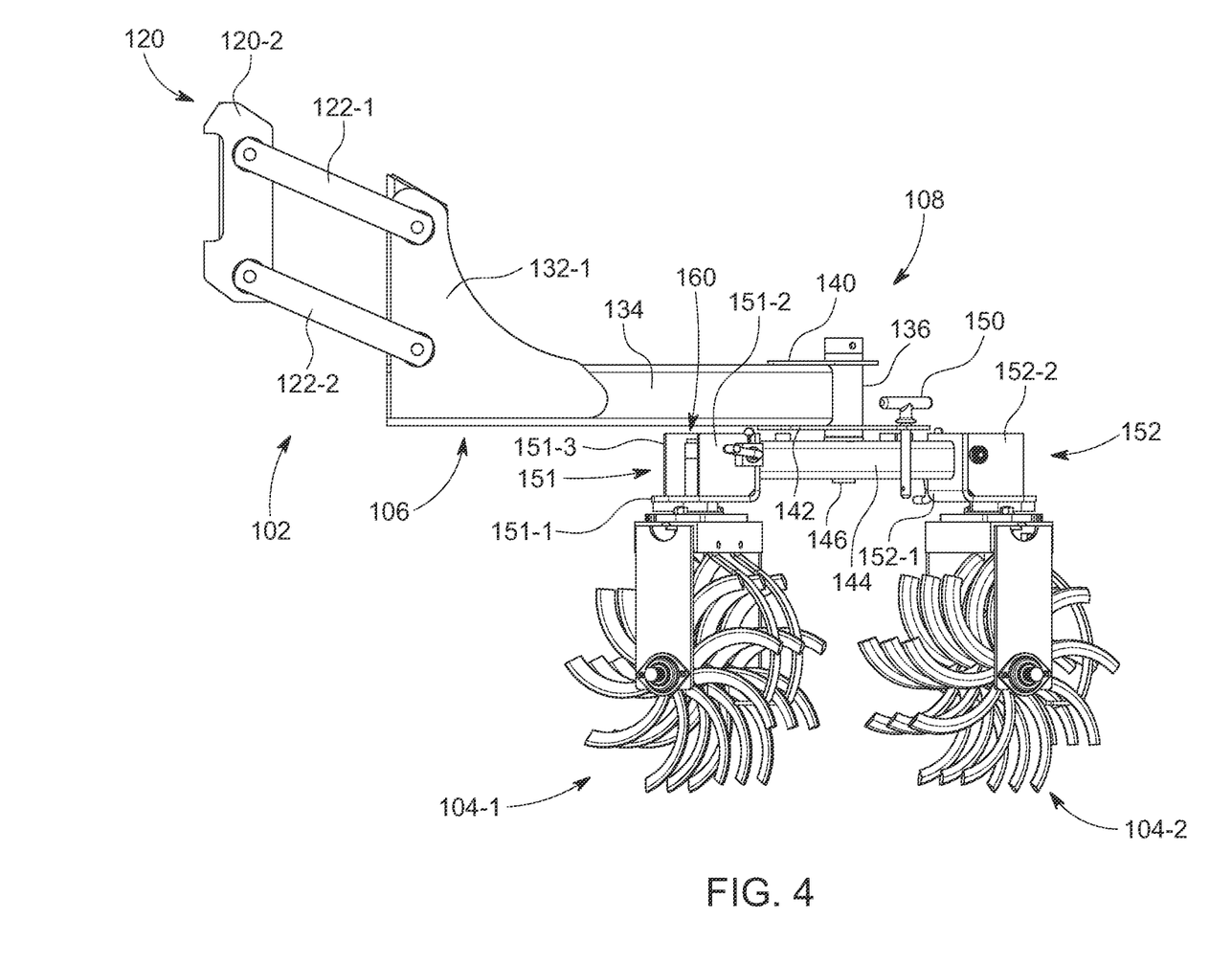
FIG. 4 is a first side elevation view of the cultivator row unit assembly of FIG. 1.
Figure 5:
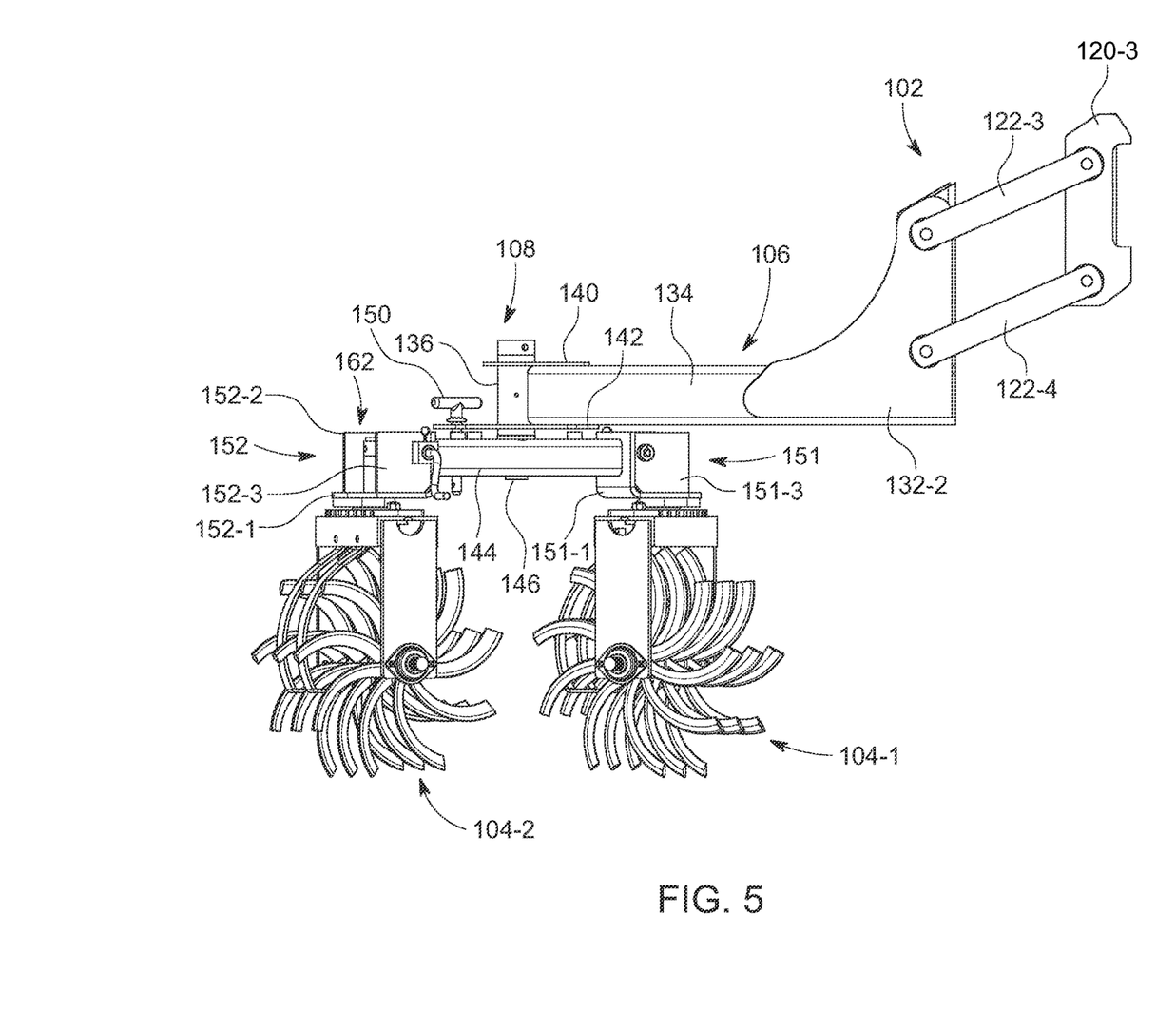
FIG. 5 is a second side elevation view of the cultivator row unit assembly of FIG. 1.
Figure 6:
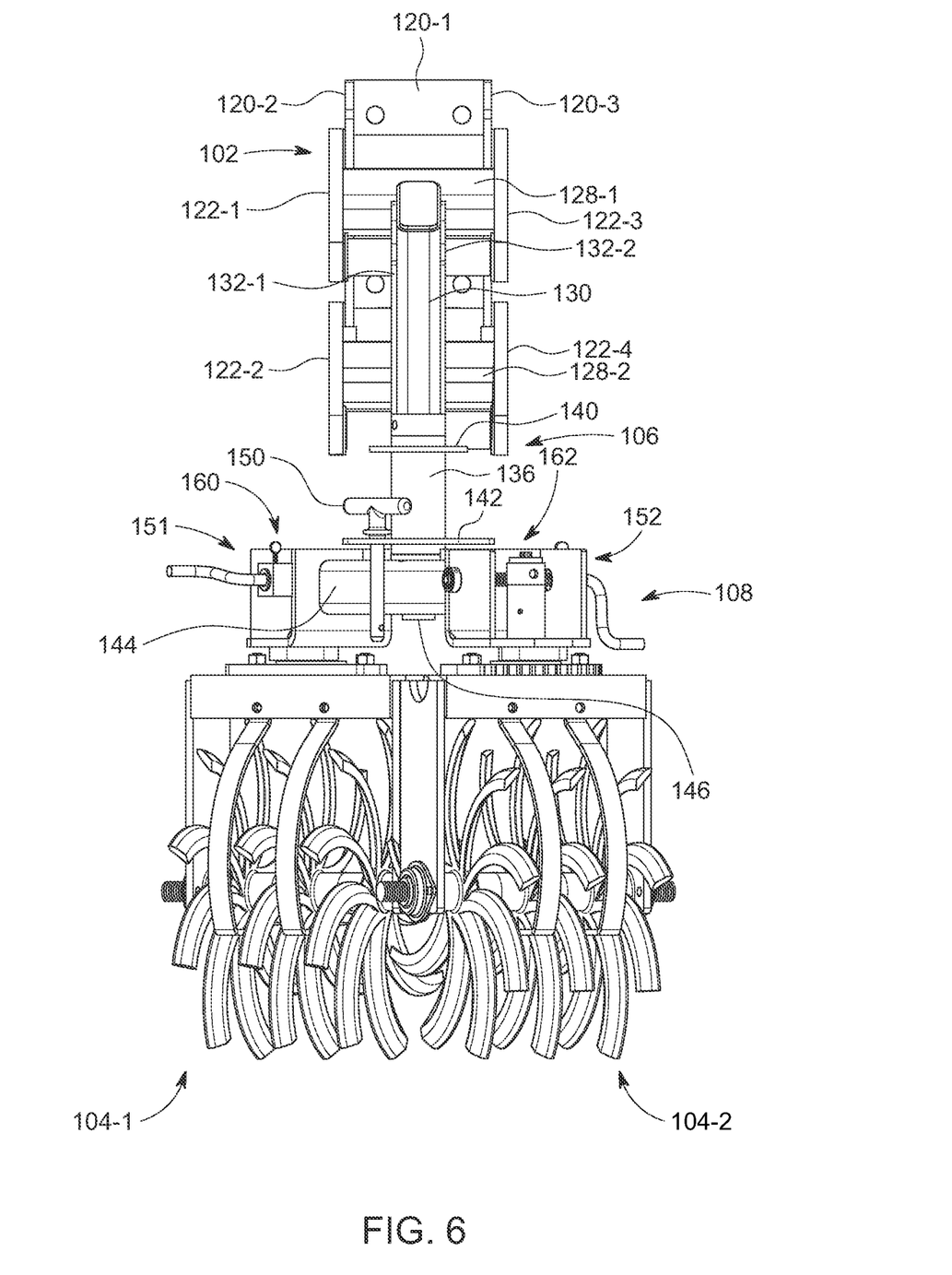
FIG. 6 is a front view of the cultivator row unit assembly of FIG. 1.
Figure 7:
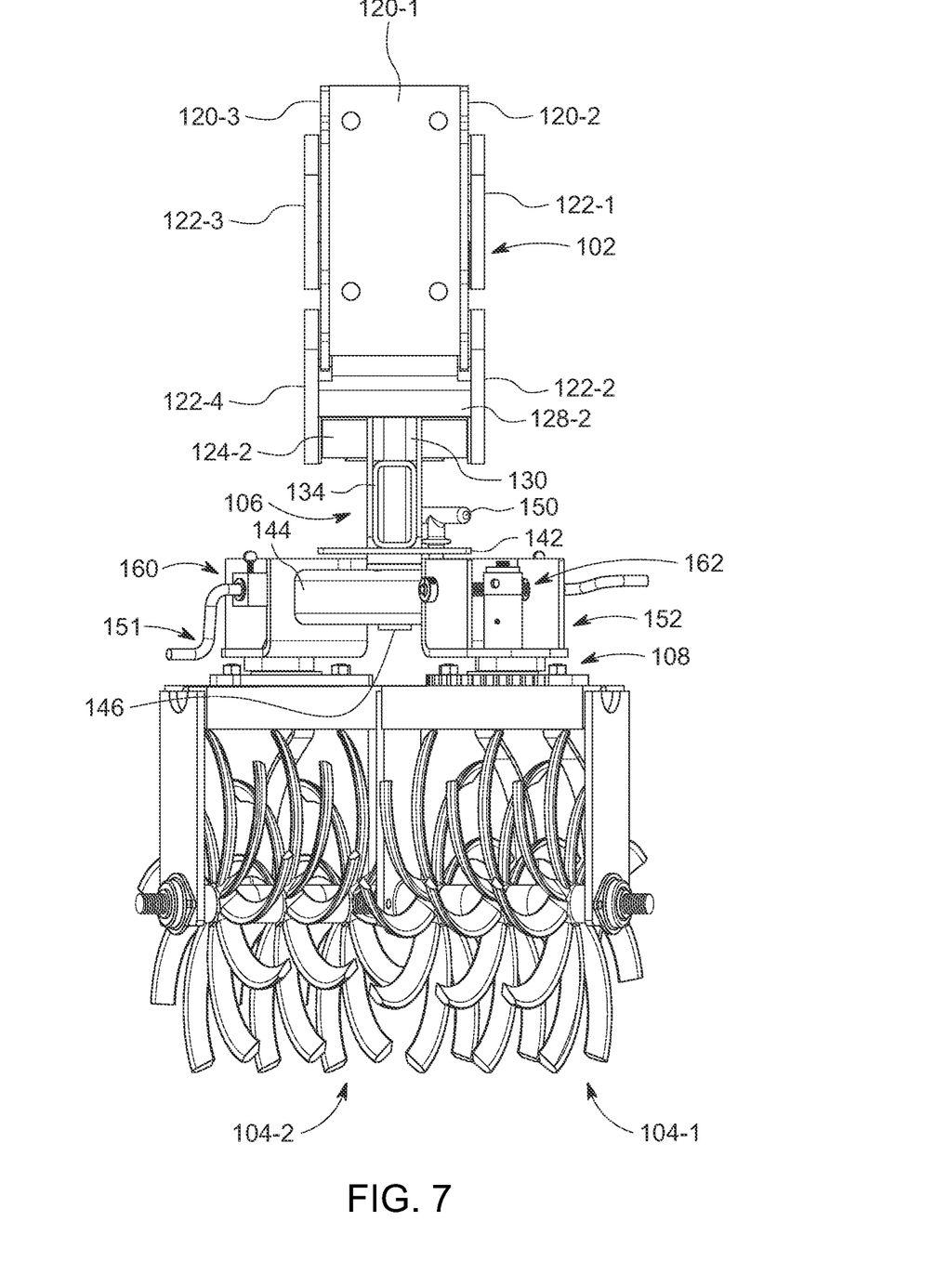
FIG. 7 is a rear view of the cultivator row unit assembly of FIG. 1.
Figure 8:
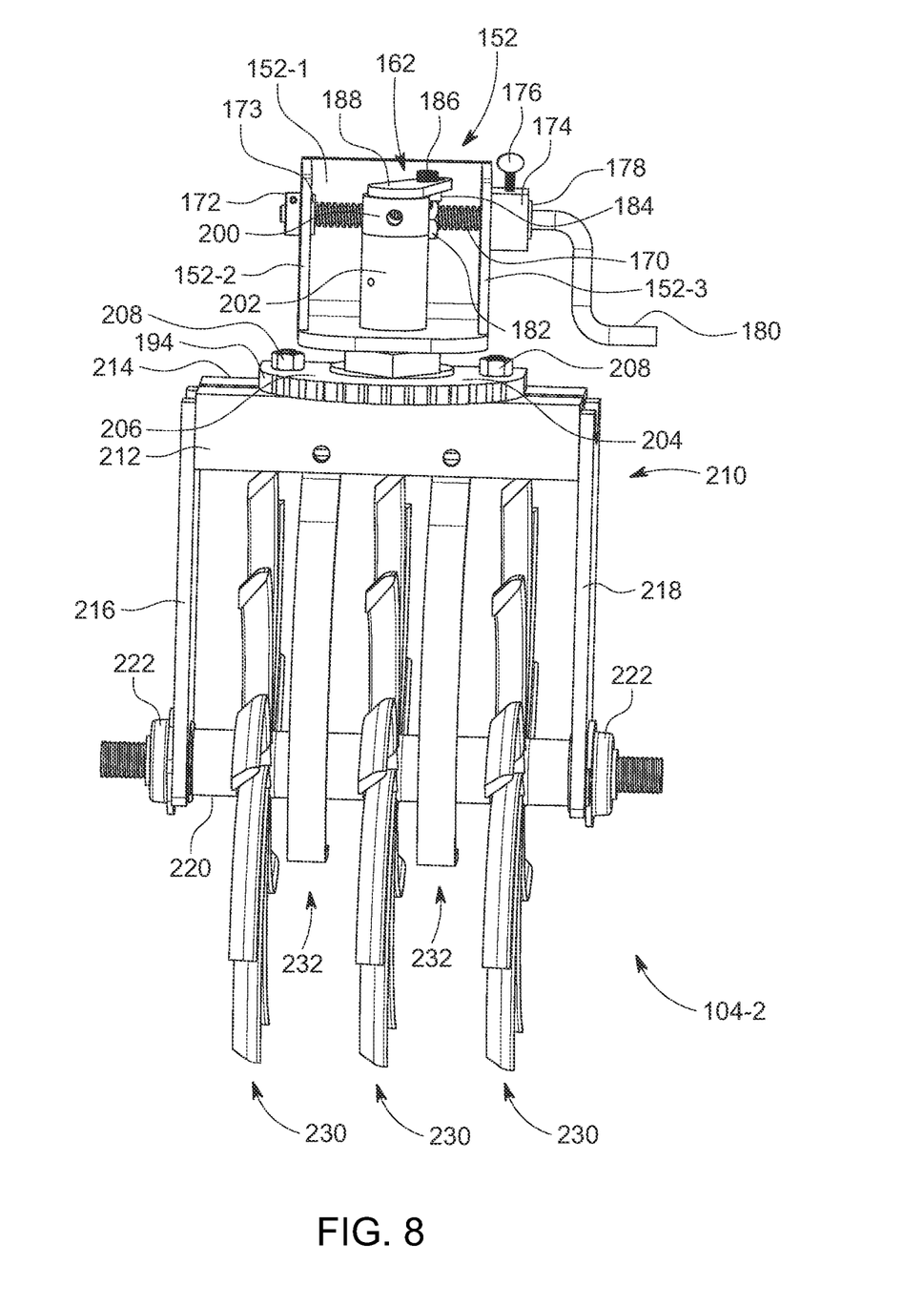
FIG. 8 is a front view of a gang unit.
Figure 9:
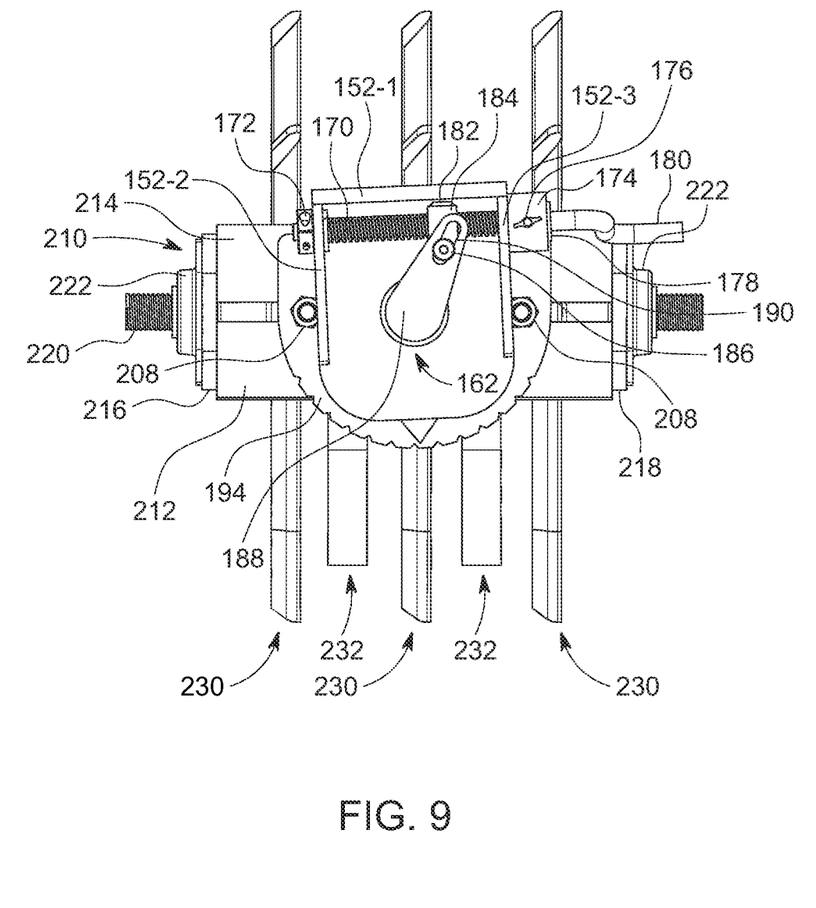
FIG. 9 is a top plan view of the gang unit of FIG. 8.

Turning to FIGS. 8 and 9, gang unit 104-2 is illustrated in further detail, wherein gang unit 104-1 is similar in construction. Additionally, FIG. 10 further illustrates gang adjustment mechanism 162 in detail, which is coupled with bracket 152 through a threaded screw 170 supported at either end between plate 152-2 and plate 152-3. As illustrated, a shaft collar 172 and washer 173 is provided to support screw 170 at a first end, whereas a support block 174 supports the screw 170 at a second end, opposite the first end. A set screw 176 can be positioned within the support block 174 to secure a bearing tube 178 therein, the bearing tube 178 allowing rotation of the screw 170 relative to the bracket 152. A handle 180 is connected with the screw 170 so that rotation of the handle 180 causes rotation of the screw 170.

Figure 10:
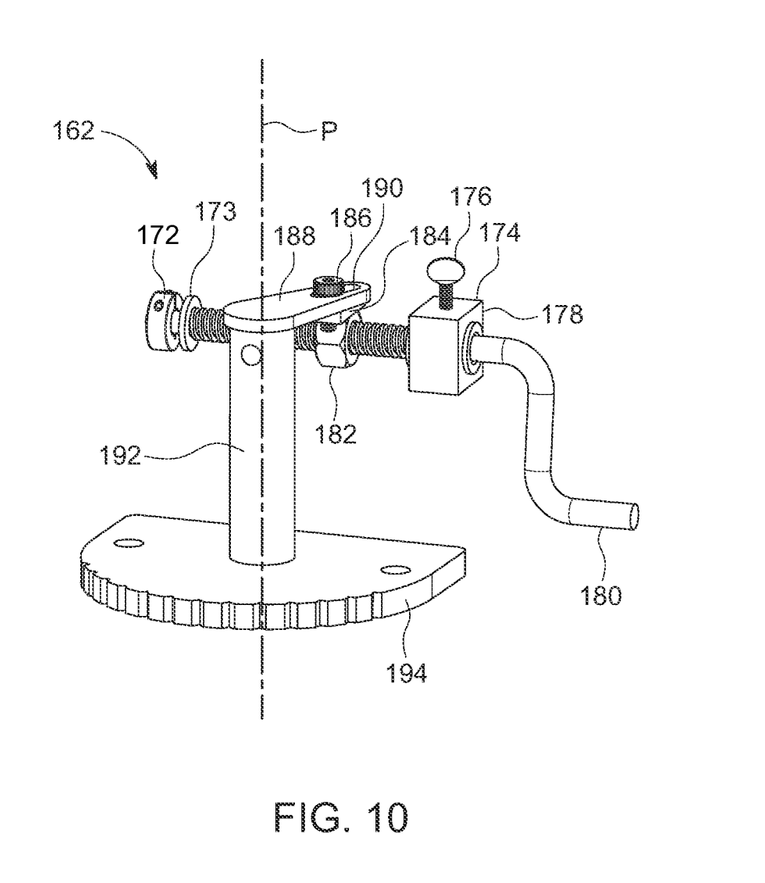
FIG. 10 is a perspective view of a gang adjustment mechanism.

Connected with the screw 170 (i.e., through a threaded connection) is a nut 182 and a coupling plate 184. A shoulder screw 186 connects the coupling plate 184 with a pivot plate 188, which includes a slot 190 positioned therein. The pivot plate 188 is connected to a pivot shaft 192, which connects with a rotation plate 194. During operation of the gang adjustment mechanism 162, upon rotation of handle 180, nut 182 moves along screw 170. Due to movement of nut 182, shoulder screw 186 causes pivot plate 188, pivot shaft 192 and rotation plate 184 to rotate about a pivot shaft axis P. Pivot shaft axis P is parallel with axis A shown in FIG. 1. As pivot plate 188 and pivot shaft 192 rotate, shoulder screw 186 moves along slot 190 to accommodate various rotational angles of pivot plate 188 with respect to bracket 152.

Pivot shaft 192 is configured to rotate with respect to bracket 152 through first and second bushings 200 and 202, respectively. A spacer plate 204 and washer 206 space the rotation plate 194 away from bracket 152. Fasteners 208 are used to secure rotation plate 194 to a gang frame assembly 210. The gang frame assembly 210 includes first and second angle brackets 212 and 214 positioned to receive the fasteners 208 therein. Coupled with the first and second angle brackets 210, 212 are first and second side plates 216 and 218, respectively. An axle 220 is supported on the side plates 216, 218 with corresponding bearings 222 coupled to the side plates 216, 218. The axle 220 rotationally supports a plurality of gangs 230 (herein three gangs are illustrated, although any number can be used) that are configured to contact the ground during operation. Additionally, as desired, a plurality of scrapers 232 are coupled with angle bracket 212 to assist in directing of ground that is cultivated by the plurality of gangs 230.

Figure 11:
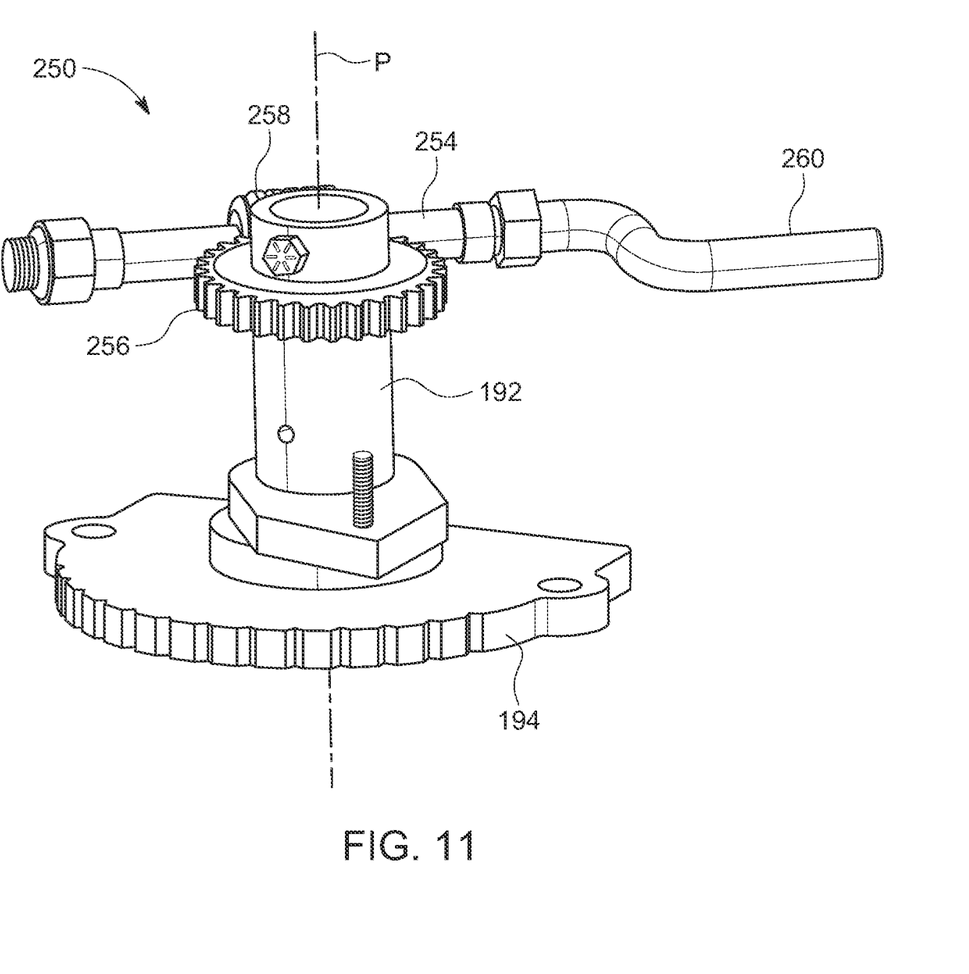
FIG. 11 is a perspective view of an alternative gang adjustment mechanism.
Figure 12:
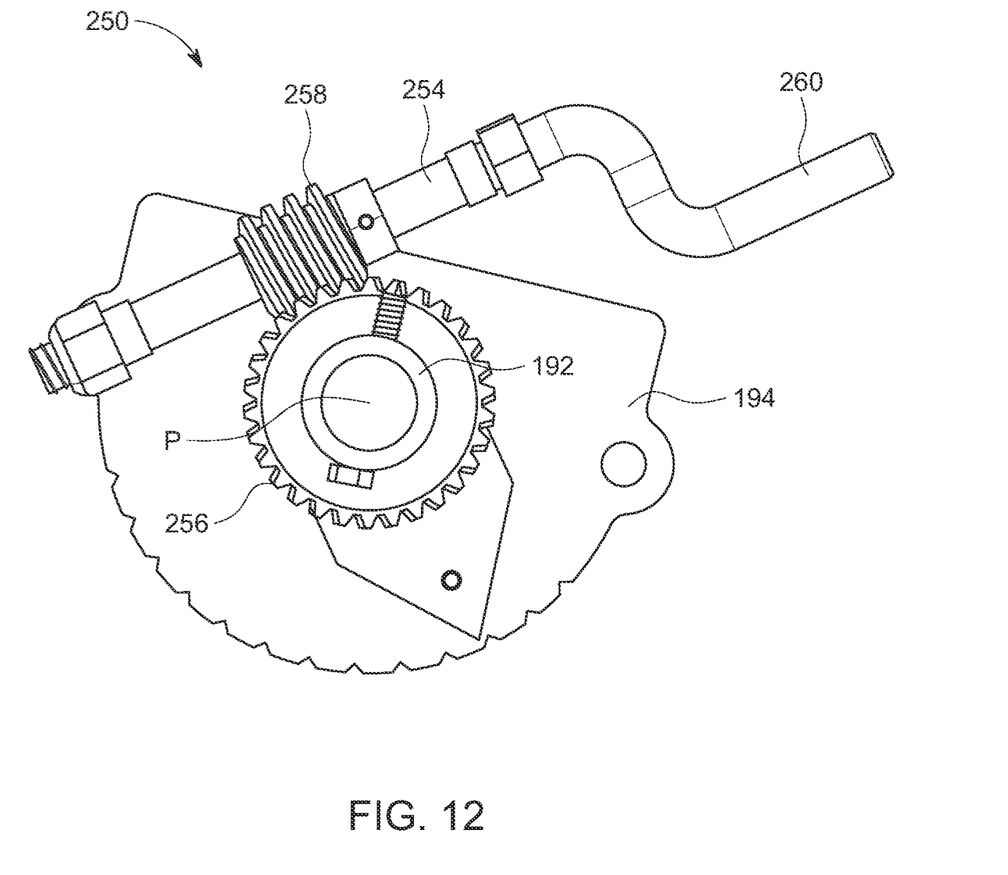
FIG. 12 is a top plan view of the gang adjustment mechanism of FIG. 11.

FIGS. 11 and 12 an alternative gang adjustment mechanism 250 that can be used in cultivator row assembly 100 in place of gang adjustment mechanism 162. Similar to gang adjustment mechanism 162, gang adjustment mechanism 250 includes pivot shaft 192 and pivot plate 194. Pivot shaft 192 is connected with a worm gear 252, which includes a worm shaft 254 and a gear wheel 256. Worm shaft 254 includes a worm 258 engaging teeth of the gear wheel 256 and a handle 260. Upon assembly, worm shaft 254 can be rotationally supported on opposed ends by bracket plate 152-2 and bracket plate 152-3. Upon rotation of handle 260, engagement between the worm 258 and gear wheel 256 causes rotation of pivot shaft 192 and pivot plate 194. Pivot plate 194 is capable of continuous rotation about pivot axis P such that pivot plate 194 is capable of being positioned in any angle about pivot axis P.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. An adjustment assembly configured to be coupled with a longitudinal support assembly of a cultivator assembly, the longitudinal support assembly extending in a longitudinal direction, comprising:
   a swing arm rotationally coupled to the longitudinal support assembly;
   a first gang unit rotationally coupled with the swing arm and including a first gang adjustment mechanism, a first axle and first and second gangs rotationally supported on the first axle to rotate about a first rotational axis; and
   a second gang unit spaced apart from the first gang unit and rotationally coupled with the swing arm and including a second gang adjustment mechanism, a second axle and third and fourth gangs rotationally supported on the second axle to rotate about a second rotational axis;
   wherein rotation of the swing arm causes rotation of the first and second rotational axes with respect to the longitudinal direction, adjustment of the first gang adjustment mechanism causes rotation of the first rotational axis with respect to the longitudinal direction and the second rotational axis and adjustment of the second gang adjustment mechanism causes rotation of the second rotational axis with respect to the longitudinal direction and the first rotational axis.

2. The adjustment assembly of claim 1, further comprising a plate coupled with the swing arm, the plate including a plurality of apertures configured to receive a pin to select an angle of the swing arm with respect to the longitudinal direction.

3. The adjustment assembly of claim 1, wherein the first gang unit is positioned at a first end of the swing arm and the second gang unit is positioned at a second end of the swing arm, opposite the first end.

4. The adjustment assembly of claim 1, wherein the first gang adjustment mechanism includes a first handle such that rotation of the handle causes rotation of the first rotational axis with respect to the longitudinal direction.

5. The adjustment assembly of claim 4, wherein the second gang adjustment mechanism includes a second handle such that rotation of the second handle causes rotation of the second rotational axis with respect to the longitudinal direction.

6. The adjustment assembly of claim 4, wherein the first gang adjustment mechanism includes a worm gear.

7. The cultivator assembly of claim 6, wherein the adjustment assembly includes a plate coupled with the swing arm, the plate including a plurality of apertures configured to receive a pin to select an angle of the swing arm with respect to the longitudinal direction.

8. The cultivator assembly of claim 6, wherein the first gang unit is positioned at a first end of the swing arm and the second gang unit is positioned at a second end of the swing arm, opposite the first end.

9. The cultivator assembly of claim 8, wherein the second gang adjustment mechanism includes a second handle such that rotation of the second handle causes rotation of the second rotational axis with respect to the longitudinal direction.

10. The cultivator assembly of claim 6, wherein the first gang adjustment mechanism includes a first handle such that rotation of the handle causes rotation of the first rotational axis with respect to the longitudinal direction.

11. A cultivator assembly, comprising:
a bracket assembly configured to couple with a toolbar;
a longitudinal support assembly coupled with the bracket assembly and extending from the bracket assembly along a longitudinal direction; and
an adjustment assembly, including:
a swing arm rotationally coupled to the longitudinal support assembly;
a first gang unit rotationally coupled with the swing arm and including a first gang adjustment mechanism, a first axle and first and second gangs rotationally supported on the first axle to rotate about a first rotational axis; and
a second gang unit spaced apart from the first gang unit and rotationally coupled with the swing arm and including a second gang adjustment mechanism, a second axle and third and fourth gangs rotationally supported on the second axle to rotate about a second rotational axis;
wherein rotation of the swing arm causes rotation of the first and second rotational axes with respect to the longitudinal direction, adjustment of the first gang adjustment mechanism causes rotation of the first rotational axis with respect to the longitudinal direction and the second rotational axis and adjustment of the second gang adjustment mechanism causes rotation of the second rotational axis with respect to the longitudinal direction and the first rotational axis.

12. A method of operating a cultivator assembly having a longitudinal support assembly extending in a longitudinal direction, comprising:
adjusting a swing arm of the cultivator assembly with respect to the longitudinal direction;
operating a first gang adjustment mechanism to adjust a first rotational axis of a first gang connected to a first end of the swing arm with respect to the longitudinal direction; and
operating a second gang adjustment mechanism to adjust a second rotational axis of a second gang connected to a second end of the swing arm with respect to the longitudinal direction and the first rotational axis, wherein adjusting the swing arm causes rotation of the first and second rotational axes with respect to the longitudinal direction.

13. The method of claim 12, wherein the cultivator assembly includes an adjustment assembly coupled with the swing arm, the adjustment assembly having a plate including a plurality of apertures configured to receive a pin to select an angle of the swing arm with respect to the longitudinal direction.

14. The method of claim 12, further comprising accessing a handle, wherein rotation of the handle causes rotation of the first rotational axis with respect to the longitudinal direction.

* * * * *

UNITED STATES PATENT AND TRADEMARK OFFICE
CERTIFICATE OF CORRECTION

PATENT NO. : 11,785,871 B2
APPLICATION NO. : 17/146310
DATED : October 17, 2023
INVENTOR(S) : Jonathan Hostetler It is certified that error appears in the above-identified patent and that said Letters Patent is hereby corrected as shown below:

In the Claims

In Claim 7 at Column 5, Line 8, delete "cultivator assembly" and insert -- adjustment assembly --

In Claim 8 at Column 5, Line 13, delete "cultivator assembly" and insert -- adjustment assembly --

In Claim 9 at Column 5, Line 17, delete "cultivator assembly" and insert -- adjustment assembly --

In Claim 10 at Column 5, Line 22, delete "cultivator assembly" and insert -- adjustment assembly --

Signed and Sealed this
Twenty-first Day of May, 2024

Katherine Kelly Vidal
*Director of the United States Patent and Trademark Office*